Aug. 22, 1967 R. H. SONNEBORN ETAL 3,337,674
METHOD FOR POLYMERIZING RESINS
Filed May 27, 1964 4 Sheets-Sheet 1
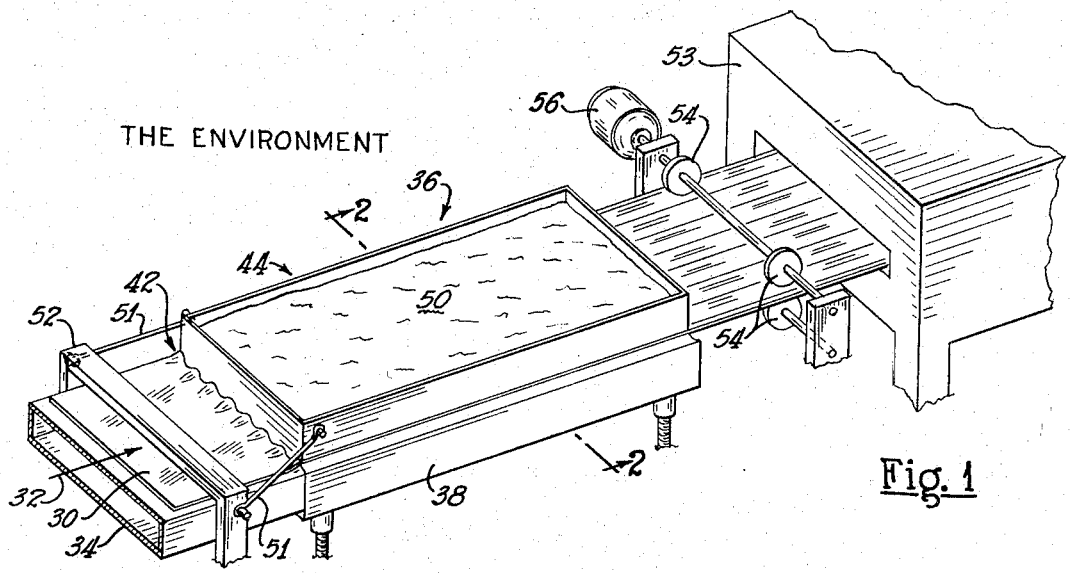
Fig. 1 — THE ENVIRONMENT
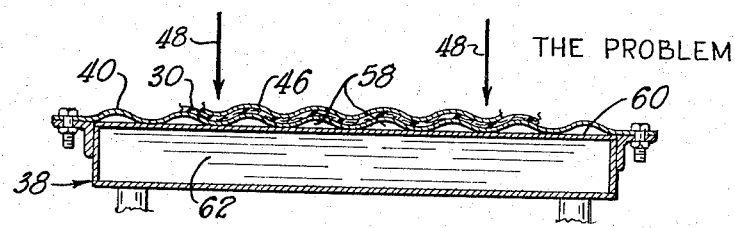
Fig. 2 — THE PROBLEM
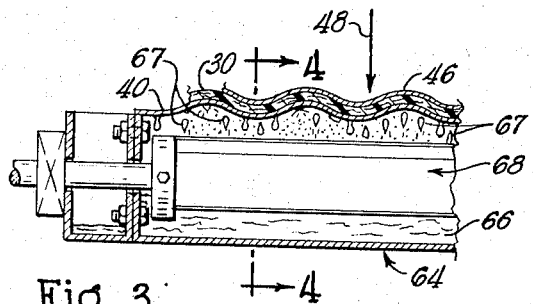
Fig. 3
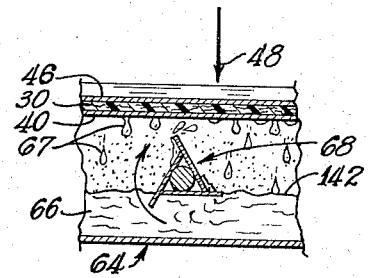
Fig. 4
SCHEMATIC SOLUTION OF THE PROBLEM
RALPH H. SONNEBORN &
FERNANDO ALVAREZ DE TOLEDO
INVENTORS
BY
Staelin & Overman
ATTORNEYS Aug. 22, 1967  R. H. SONNEBORN ETAL  3,337,674
METHOD FOR POLYMERIZING RESINS
Filed May 27, 1964
4 Sheets-Sheet 2
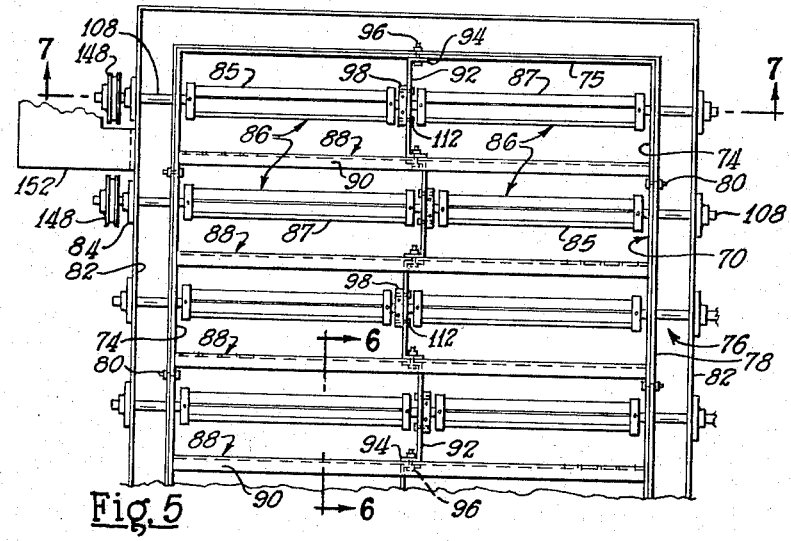
Fig. 5
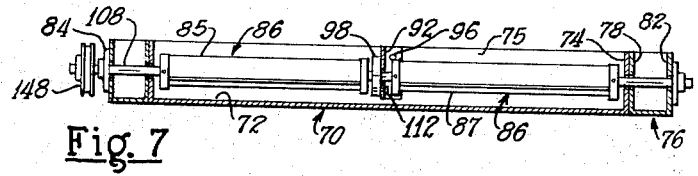
Fig. 7
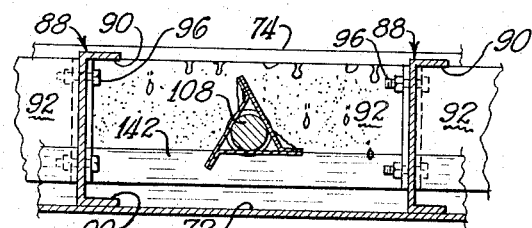
Fig. 6
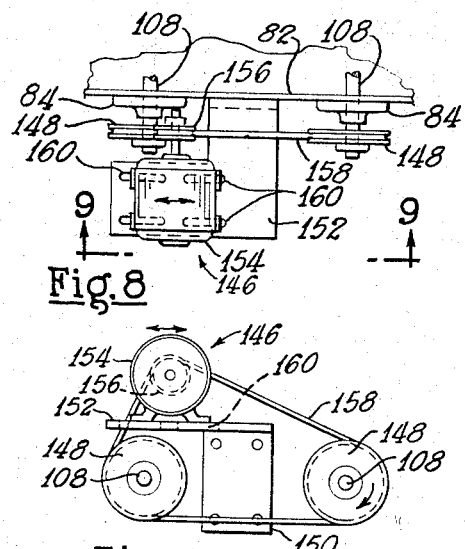
Fig. 8
Fig. 9
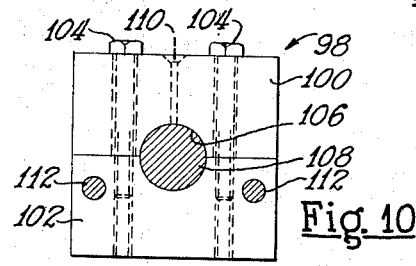
Fig. 10
RALPH H. SONNEBORN &
FERNANDO ALVAREZ DE TOLEDO
INVENTORS
BY
Staelin & Overman
ATTORNEYS

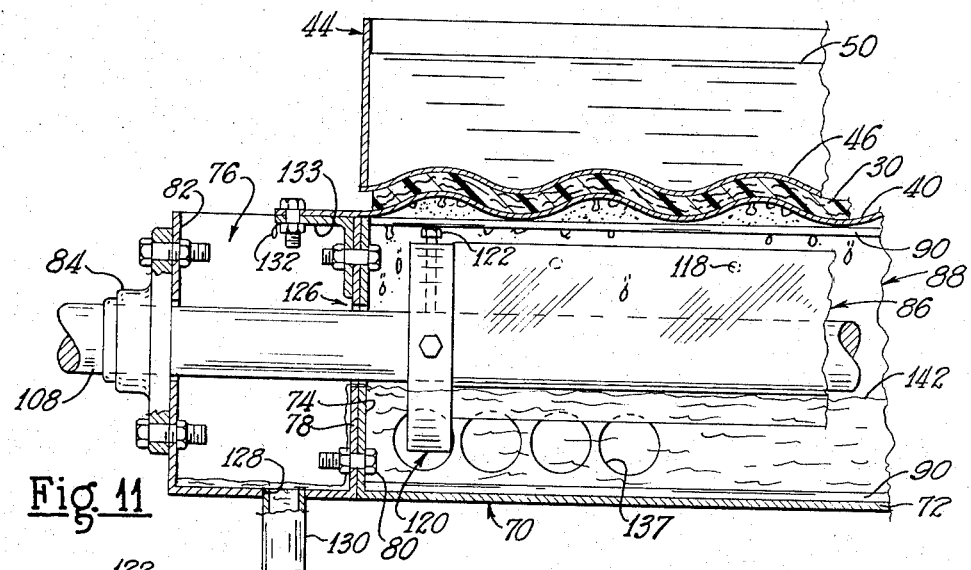
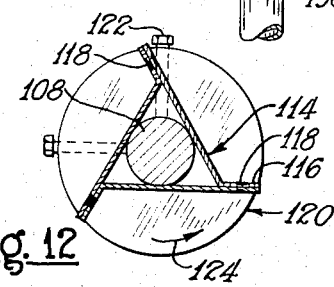
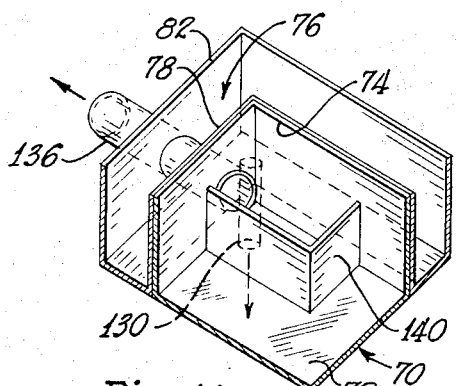
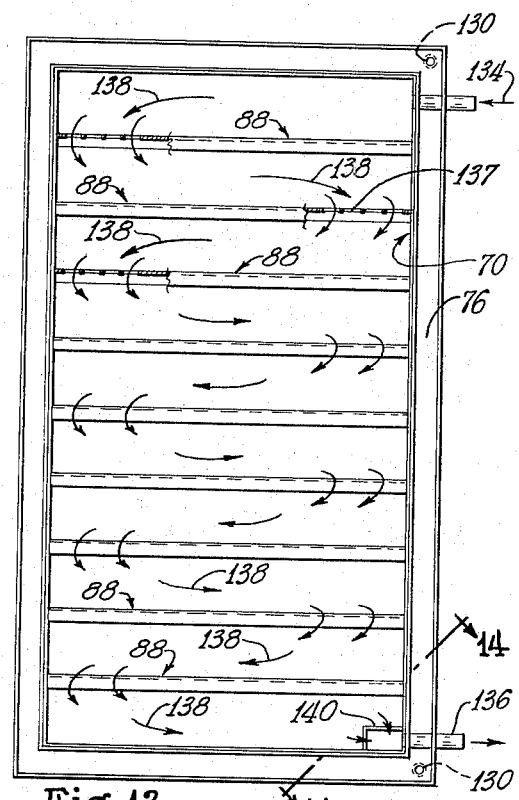
Aug. 22, 1967  R. H. SONNEBORN ETAL  3,337,674
METHOD FOR POLYMERIZING RESINS
Filed May 27, 1964  4 Sheets-Sheet 3
Fig. 11
Fig. 12
Fig. 14
Fig. 13
INVENTORS
RALPH H. SONNEBORN &
FERNANDO ALVAREZ DE TOLEDO
BY
Staelin & Overman
ATTORNEYS

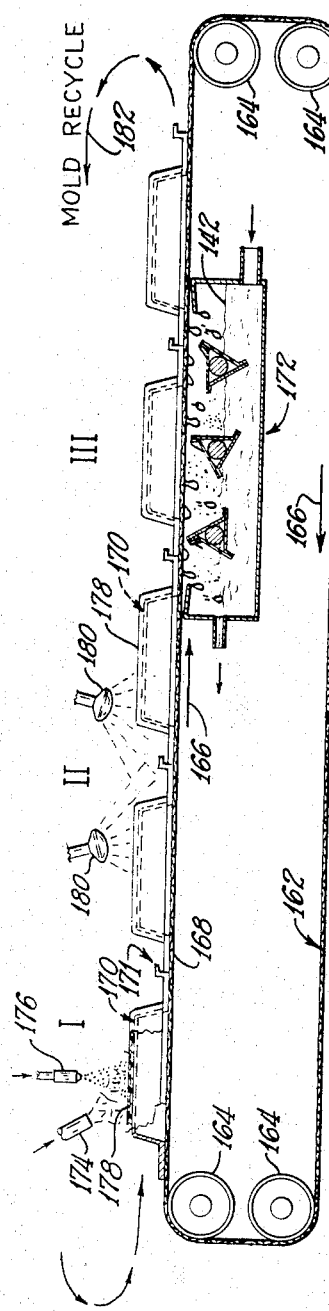
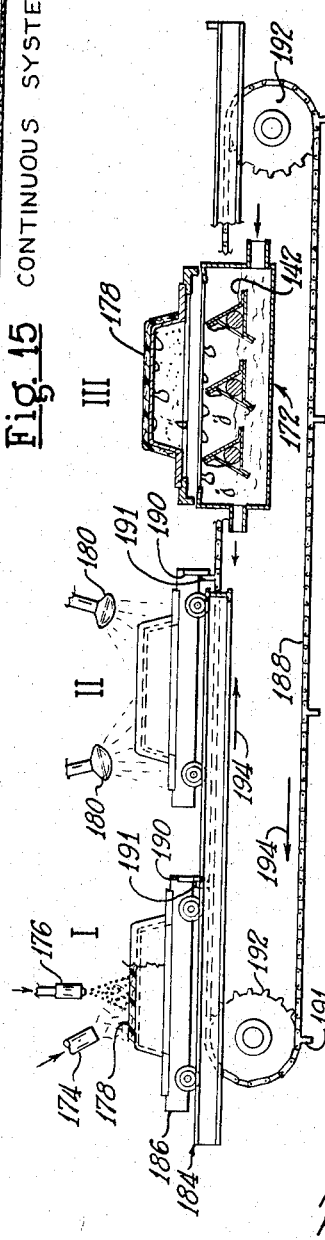
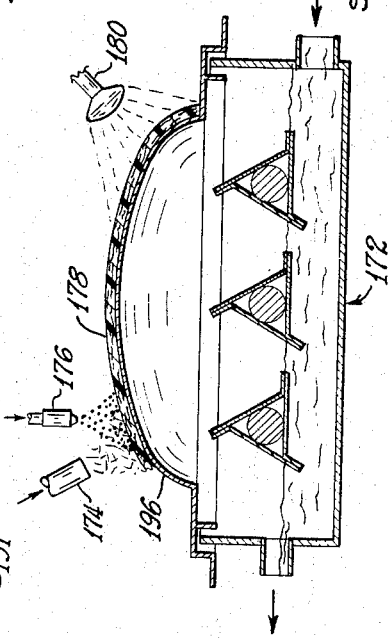
RALPH H. SONNEBORN &
FERNANDO ALVAREZ DE TOLEDO
INVENTORS
BY
*Staelin & Overman*
ATTORNEYS

United States Patent Office

3,337,674
Patented Aug. 22, 1967

3,337,674
METHOD FOR POLYMERIZING RESINS
Ralph H. Sonneborn, Newark, Ohio, and Fernando Alvarez de Toledo, Crainhem, Belgium, assignors to Owens-Corning Fiberglas Corporation, Toledo, Ohio, a corporation of Delaware
Filed May 27, 1964, Ser. No. 370,535
3 Claims. (Cl. 264—327)

This invention relates to the polymerization of resin systems having exotherms of reaction; still more particularly the invention relates to a mold cooling system for controlling the polymerization of resins having sharp and high exotherms of reaction; and also to a method of polymerizing such resins.

*The problem*

In the production of molded articles from resin systems displaying high and sharp exotherms of reaction, there is a substantial problem of controlling the polymerization against run-away. Unless this is done, the monomer component of the resin may boil, producing bubble-like defects in the article which will cause the part to be rejected. This is a particularly acute problem in acrylic resin systems because they are characterized by the development of such high exotherms of reaction that the monomer component will be boiled quite readily unless the exotherm is carefully controlled.

In one prior system, the polymerizing layup was run over a corrugated mold, or other, to develop the shape, and retained on such mold for a sufficient time to allow the resin to polymerize to a hard solid state.

Two methods of cooling the polymerizing resin in order to prevent monomer boil have been used in that prior system, as follows:

In the first method, a platen through which water as a heat-transfer medium was circulated, had a replaceable mold plate on top of it. However, because of the corrugations of the mold, air pockets were produced between the mold plate and the platen top so that accurate control was often difficult because of the retarding effect against fast heat-exchange caused by the air pockets. This system had the advantage of ease of mold replacement, but the consequent disadvantage of the air pockets that introduced a difficult control factor, outweighed the advantage.

In the second method, the top of the lower heat-exchange tank was actually formed as the mold surface. This provided better heat transfer but presented the difficulty that every time a shape was to be changed, the entire lower mold tank had to be replaced. This proved to be prohibitively expensive because of the many shapes involved. Also, time was consumed for disconnecting and setting a different tank into place every time a run of another cross-sectional configuration of panel was to be made.

Accordingly, the present invention is an improvement over the prior methods, and also is extensible in scope substantially therebeyond for controlling resin polymerization in various kinds of layup and formation systems. Therefore, a substantial advance to the art is provided by the present invention wherein mold plates of any shape are uniformly cooled by intimate contact with a heat-transfer medium, and while such mold plates are either:

stationary and opposed for continuous production through them;
individual and continuously moved;
individual and intermittently moved;
or individual and held stationary.

It is an important object of this invention to provide a novel method for cooling molds used for shaping resin materials displaying from modest, easily controllable, up to sharp and difficulty controllable exotherms of polymerization.

A further object is to provide a fool-proof system for cooling a mold carrying a polymerizing resin, that utilizes droplets of water, as distinguished from a fine mist or spray, to intimately wet the opposite side of the mold surface and thereby provide a perfect heat transfer with the resin exotherm.

A further object is to provide a method for moving a polymerizing resin mass across a heat exchange-medium and in intimate contact with the medium to control the exotherm of polymerization of the resin.

Other objects of this invention will appear in the following description and appended claims, reference being had to the accompanying drawings forming a part of this specification wherein like reference characters designate corresponding parts in the several views.

FIGURE 1 is a fragmentary isometric view of a continuous panel line wherein the exotherm of polymerization of a resin is controlled while a shape is being stabilized, and illustrating an environment for the present invention;

FIGURE 2 is a sectional view taken along the line 2—2 of FIGURE 1, specifically illustrating the problem solved by the present invention;

FIGURE 3 is a sectional view showing schematically the manner in which the problem has been solved in accordance with the present invention;

FIGURE 4 is a sectional view taken along line 4—4 of FIGURE 3;

FIGURE 5 is a fragmentary top plan view of the mechanism of the invention;

FIGURE 6 is a fragmentary sectional view taken along line 6—6 of FIGURE 5;

FIGURE 7 is a sectional view taken along line 7—7 of FIGURE 5;

FIGURE 8 is a top plan view of the motor, and its mounting, for driving the splasher paddles utilized in FIGURE 5;

FIGURE 9 is an elevation view taken along the line 9—9 of FIGURE 8;

FIGURE 10 is an enlarged, side elevation view of a center bearing used in FIGURE 5;

FIGURE 11 is an enlarged, fragmentary transverse sectional view similar to FIGURE 7, showing the spill trough and the splasher paddle construction in greater detail;

FIGURE 12 is a transverse sectional view of a splash paddle, the size of FIGURE 11;

FIGURE 13 is a top plan view, schematic in nature, and illustrating the fluid flow pattern used in the invention;

FIGURE 14 is a fragmentary perspective view taken along line 14—14 of FIGURE 13, showing the water level control mechanism at the outlet end of FIGURE 13;

FIGURE 15 is a schematic side elevational view of a continuous production line using individual molds, as distinguished from the continuous, opposed mold system of FIGURES 1-14;

FIGURE 16 is a schematic side elevational view illustrating the extended scope of invention as applied to an incremental system; where individual molds are advanced by steps through the process; and FIGURE 17 is a schematic side elevational view of apparatus and process wherein a one station mold is utilized.

It is to be understood that the present invention is not limited in its application to the details of construction and arrangement of parts illustrated in the drawings, since the invention is capable of other embodiments and of being practiced or carried out in various ways. Also, it is to be understood that the phraseology or terminology employed herein is for the purpose of description and not of limitation.

Perspective view

Briefly the present invention relates to a novel mechanism, and system, for controlling the exotherm of polymerization of synthetic resins, wherein water is used as a typical heat-exchange medium. In this invention, the heat-exchange medium is distributed directly upon one surface or side of a mold carrying a polymerizing resin mass, in droplet form, as distinguished from a fog or mist, thereby providing a fast and intimate heat transfer, and perfect control of the polymerizing resin. Along with the foregoing, the present invention provides rapid and economical mold change. The initial part of the disclosure will be directed to a continuous panel line where patio panels and the like are produced. The last part of the disclosure will illustrate the invention as applied to individual molds for resin layups that are:

(a) Continuously moved in a production process;
(b) Intermittently moved in a stepwise manner in a production process; or
(c) Held stationary while layup, resin gel, and resin polymerization are all effected at one position.

The environment of the present invention

FIGURE 1 illustrates a fragmentary portion of a continuous panel line wherein an acrylic resin system is combined with reinforcing fibers and retained between impervious membranes such as cellophane, while the resin is polymerized. A shape is developed, of suitable cross-sectional configuration, and maintained in the molded form until the resin has passed the peak exotherm temperature.

As shown in FIGURE 1, a layup 30 is being propelled in the arrow direction 32 through a molding and curing mechanism. A lower tank 34, suitably containing heated water as an energy transfer medium, serves as a first support over which the layup 30 is passed. This is the preforming phase. The purpose of this tank 34 is to warm the resin of the layup to a level to initiate polymerization and carry the polymerization to the gel stage. Thus, in the subsequent shape development section 36 the resin will remain immobile and not flow. This assumes a uniform thickness throughout the corrugated or other section, and extending entirely across the panel.

The shape development section 36 includes a lower tank 38 that has a mold plate 40, FIGURE 2, suitably secured to the upper surface thereof. An appropriate entrance mouth is provided at 42 to facilitate the development of a corrugated shape from the entering flat shape 30.

An upper tank 44 floats on the layup as it passes over the bottom mold plate 40. This is tethered by means of cables 51, connected to a bracket arm 52. The bottom 46 of upper tank 44 is of a shaped configuration, complementing that of the bottom mold plate 40. As shown in FIGURE 2, the layup 30 is carried between the mold surfaces 40 and 46 during the time that the shape is solidified by controlled polymerization of the resin.

The shape developing and retaining force is indicated by the arrows 48, FIGURE 2. This is provided by the weight of water in the top tank 44.

The body of water 50, retained in the upper tank 44, and the body of water 62, in the lower tank 38, not only act as a polymerization initiator, but also as a heat sink. Thus, since it is heated, it will cause the resin to polymerize. Further, when the exotherm of the resin occurs, heat is absorbed by the water and the polymerization is protected against "run-away," once it reaches a high rate of activity.

It is to be understood that the water is continuously circulated through the tanks and back to a heat-exchanger by means not shown, to either heat or cool it as necessary. Thus, the water is maintained at an appropriate temperature level for the processing.

After the resin is polymerized to a hard solid state, it leaves the shape-development section 36 and passes to a post-curing oven 53. Between the outlet end of shape-development section 36 and the entrance into the oven 53, upper and lower sets of drive rolls 54 frictionally engage the laminate and propel it forwardly, with power provided by a drive motor 56.

The problem

This is illustrated in FIGURE 2 of the drawings, wherein air pockets 58 exist between the apexes of the corrugations of lower mold plate 40 and the flat tank top 60. Even though the lower tank 38 is maintained full of water, clear to the top 60, the air pockets 58 hinder effective heat transfer between the polymerizing layup 30, and the water 62 in lower tank 38. Further, heat transfer is required through mold plate 40 and tank top 60 both, before it reaches the water 62, or vice versa, depending upon whether polymerization is being initiated or the exotherm controlled.

Although the system illustrating the problem has met with an appreciable degree of success, and although many satisfactory panels have been made therefrom, it lacks the quickness of control required when processing acrylic resins. These have such a high and sharp exotherm of polymerization, that very fast response is required for high quality production. For example, when an acrylic system gets started running away, it can reach 330° F. in a period of time measured almost in seconds. It will be evident that unless exact and intimate heat exchange is provided, monomer boil will be the mandatory result, and the product will be ruined.

The present invention has overcome this problem and smoothed out production in such a remarkable manner that tt is submitted that the invention is not only applicable in the previous environment, but also extensible to other types of resin polymerizing and handling systems as will be discussed hereinafter.

The invention schematically illustrated

FIGURES 3 and 4 illustrate the manner in which an open top tank 64 is utilized to retain a body of water 66 held at a controlled temperature level. A plurality of splasher panels 68 are positioned transversely of the tank 64, as illustrated in FIGURES 3 and 5. These are rotated, and dipped into the body of water 66 to pick up the water and throw it as droplets 67 up against the bottom side of the lower mold plate 40. It is to be noted that the droplets 67 are distinguishable from a mist or fog. They thus wet the mold plate adequately and provide perfect heat transfer through the mold plate 40 to the polymerizing resin 30.

In accordance with the present invention, the following advantages are provided:

The lower mold plate 40 is readily replaceable as shown in FIGURE 2; and

Perfect heat transfer for exact control of acrylic resin systems, typifying those with high exotherms of polymerization, is provided.

The invention in detail

FIGURE 5 provides a general overall view of the invention from a position analogous to that of the bottom surface of the lower mold plate 40, looking down into the mechanism utilized to develop the water droplets. The main, central tank 70 comprises a bottom 72 and side walls 74. The top is open. Around the outside of the tank is a spill or overflow trough 76 of U-shaped section is shown in FIGURE 7.

As shown in FIGURE 5, the inside wall 78 of overflow trough 76 is suitably fastened by bolting as at 80.

It is to be understood that sidewalls 74, 78 and 82 are of sufficiently thick material to provide support for outboard bearings 84 for the splasher units 86.

Extending transversely across the tank 70 are a plurality of spaced sheet metal rib members 88. These are formed of generally U-shaped configuration, as shown in FIGURE 6, with overturned edge flanges 90 for longitudinal stiffness. At their ends, the rib members 88 are suitably welded to the inside surfaces of the side walls 74, and along the lower edge to the bottom 72, and thus are held in position. It will be noted that these rib members 88 extend transversely of the longitudinal axis of the tank 70 and are spaced axially and parallel to one another along the length of the tank.

The central tank 70 is of substantial width. If the splasher units 86 spanned the tank 70, they would be unduly long and there would be whip during their rotation. Accordingly, longitudinally oriented spacer walls 92 are provided down the center of the unit. These, as shown in FIGURE 5, are also of generally U-shaped section with the over-turned flanges 94 providing stiffness. These units are extended between the end walls 75 and all of the transverse rib members 88, and fastened with bolts 96. As shown in FIGURE 6, these units are fitted beneath the top overturned edges 90 of the sheet metal rib members 88 for simplified fabrication. However, they are of a width such that they do not extend clear to the bottom tank wall 72 in order that the heat exchange medium can flow freely over the bottom 72.

The purpose of the longitudinally disposed spacer walls 92 is to support center bearings 98 forming part of the splasher units 86. As shown in FIGURE 10, this bearing is made of Micarta and thus selected for operation under conditions where it is exposed to the water spray and is actually lubricated by the spray being conducted to the bearing surfaces. Micarta is a trademark for heavy-duty, thermo-setting, plastic materials made from fabric or paper impregnated with phenolformaldehyde resins and compressed under heat into a permanently solid substance with high structural and dielectric properties. The parts so made are resistant to corrosion under conditions of high humidity such as contemplated here, and with water as a lubricant, form a fine-bearing material for drive shifts as typified by shaft 108.

This construction is shown in FIGURE 10, and comprises upper and lower bearing halves 100 and 102 that are fastened together by bolts 104 run through appropriate aligned holes, as indicated. A bore 106 is provided to accept the shafts 108 upon which the splasher units 86 are mounted. A lubricant feed hole 110 opens upwardly so that dropping water will be caught and fed in around the shaft for lubrication purposes.

Transverse bolts 112 pass through the lower half 102 and spacer walls 92, to secure the bearing assemblies 98 in place.

The configuration of the splasher assemblies

By referring to FIGURE 12, the sectional configuration of the splasher assemblies can be described. As there shown, three separate blade units 114 are fabricated together to make a single assembly. Each blade unit 114 is of stainless steel sheet stock for strength and corrosion resistance, although the broad scope of invention would include other equivalent materials. In the raw sheet form this is an elongated rectangular strip.

Along one edge there is an upturned flange 116. This is placed in contact with the opposite flat edge of the next blade unit 114. The three blades are put together in the same fashion.

Spot welds 118 along the length of the flanges 116 secure the components together in assembled array.

The triangular enclosure produced by the foregoing orientation of the blades is of such a size that the central portions of the blades snugly engage shaft 108. This provides rigid support against the units flopping or whipping relative to the shaft during their rotation.

Referring now to FIGURE 11, note the end washer 120. One of these is secured to each end of a blade set. The washer 120 has a center hole, to be fitted upon shaft 108. Set screws 122 pass radially through the washers and are tightened down to engage the outside of shaft 108. This locks the blade assembly 114 to the shaft for rotation.

A word at this time is important regarding the configuration of the splasher units. This particular design is the result of extended research and has been found to provide much improved droplet development over other configurations. For example, squirrel cage fan configurations were tried with two, three and more blades but with lesser efficiency in the effect. Here, the counterclockwise rotation of the units in the direction 124, FIGURE 12, provides a dipping action and then a throwing action analogous to the human hand whereby very small droplets are produced, which are clearly distinguishable from a fog, mist, or fine spray. This provides the extremely good heat exchange and polymerization control mentioned hereinbefore.

The fact that the central portions of the blades 114 embrace the shaft all along the length in a very close manner provides an extremely rigid, rod-like unit. This is more rigid than a squirrel cage unit where long flexible blades are attached only at the ends to support plates. If intermediate webs are used in a squirrel cage structure, of course the costs of fabrication are substantially increased.

*Uniform droplet pattern produced by the splasher assemblies*

Referring to FIGURE 5, note that the longitudinally disposed spacer walls 92 are staggered on each side of the axial center line of tank 70. The overturned flanges 94 make this possible with the flanges being positioned opposite one another on each side of rib members 88. With the bearing members 98 positioned on the outside of the bight portion of each spacer wall 92, a zigzag pattern of these units is produced.

Between a bearing 98 and its adjacent side wall 74 there is used a so-called short blade assembly 85; between the other side of the spacer wall 92 and the other side 74 of tank 70, there is a greater distance to be spanned. Thus a so-called long splasher unit 87 is utilized. This means that down the length of the tank, the units 85 are staggered, as also are units 87. The important point is that the ends of the units 87 overlap to produce a continuous spray pattern without gaps at the center. The effect in actual operation is substantially equivalent to the splasher units 86 extending from side wall to side wall 74, 74 of tank 70.

Actually the droplet pattern produced is unexpectedly uniform as the result of the configuration of parts utilized. This is an important feature along with the fact that the splasher units 86 have center support for added rigidity and resistance against whip.

*End support of the splashers*

Refer to FIGURES 7 and 11 for the following discussion:

On the outside of walls 82 of the overflow trough 76 are secured bearings 84. Those actually used were sealed ball bearing pillow block units but still required protection from direct exposure to the hot water contained in tank 70. These ball bearings, of course, are distinguished from the Micarta bearings 98 which are specifically designed to withstand exposure to water. However, if Micarta bearings were used all the way through, frictional resistance would be unduly high.

By placing the bearings 84 on the outside of the outer walls 82 of the overflow trough 76, they are thus isolated from the water spray. The trough 76 serves to catch any spill and drain it away, to protect the bearings 84. The lubrication that is normally packed into these bearings 84, preferably water pump grease, is effective to resist atmospheric moisture in the normal manner.

Further, as shown in FIGURE 11, shaft 108 extends through walls 74 and 78 without engagement therewith, by the fact that the hole 126 is a little larger than the shaft. An advantage at this point is that the bottom portions of the holes 126 facilitate overflow into trough 76, when such conditions arise, and such overflow is carried away by drain holes 128, connected to conduits 130. This arrangement also diminishes the need for tight seals to prevent leakage and which usually require constant maintenance.

At this point referring to FIGURE 11, a further utility feature of overflow trough 76 becomes apparent. The bottom mold plate 40 is suitably bolted in position on a bracket arm 133, with the outer edge extending over trough 76. Drip 132 from the underneath side is thus free to fall into trough 76 and be carried away. This provides good housekeeping around the machine and obviates the necessity for floor drains that would otherwise be required.

Schematic flow through the system

This is shown in FIGURE 13 where an inlet conduit 134 is provided at one end of tank 70, and an outlet conduit 136 is provided at the other end of the tank.

As regards integration of this arrangement into the production line shown in FIGURE 1, it is to be pointed out that the inlet water is furthest downstream relative to the advancing resin. At this point it has its lowest temperature, by not having absorbed exothermic heat. The water travels upstream against the advancing resin and thus carries away and immediately disposes of the exothermic heat generated by the polymerization of the resin. The exotherm is thus uniformly swept away or carried away, for effective control.

Relative to FIGURE 13, it should be noted that the transverse rib members 88 are apertured at 137 at opposite ends, in adjacent units, to provide a zigzag flow as schematically illustrated by the arrows 138. This assures uniform distribution of the heat-exchange medium, providing uniform temperature over the entire area of the system.

Level control for the unit is shown in FIGURES 13 and 14. This comprises a retaining wall 140 of appropriate height to establish a water level 142, FIGURE 11, for proper droplet generation. The overflow conduit 136 extends through walls 74, 78, and 82 to convey system water back to the temperature adjusting mechanism, such as a heat exchanger. The reason why this water is not merely spilled into the overflow trough 76 and conveyed away by means of the drain conduits 130 thereof is that this water is of a little higher temperature than the loss of spray and leakage that accumulates in the trough 76. Thus, less heat exchange will be required for this the main flow, and the system can be stabilized more effectively than would otherwise be the case.

Rotation of the splasher units 86

Refer to FIGURES 8 and 9 for this discussion.

In accordance with the present invention, an individual motor unit 146 is provided for each pair of adjacent splashers 86. Thus, if one drive unit should go out by malfunction, the remainder will continue to operate and production can continue. This is brought about by the overlapping center feature and uniform droplet pattern distribution previously discussed. As shown in the upper left corner of FIGURE 5, each of the shafts 108 is provided with a pulley 148. These are also shown in FIGURES 8 and 9. A motor mount, comprising a vertical plate 150, is fastened to the outside wall 82 of overflow trough 76 between adjacent shafts 108. A horizontal plate 152 projects outwardly as shown in FIGURE 8, and in FIGURE 5 in fragment. This horizontal plate 152 is of L-shaped configuration and notched to extend over the left hand pulley 148 as shown in FIGURE 9. The motor 154, as shown in FIGURES 8 and 9, sits on the left hand end of plate 152 with the pulley 156 carried by the shaft thereof extended out in alignment over the left hand pulley 148 of a splasher unit 86.

As shown in FIGURE 9, a belt 158 laps pulley 156 and the two pulleys 148 to drive a pair of the splasher units 86.

As indicated in FIGURE 8, elongated slots 160 are formed in plate 152 so that the motor 154 can be adjusted to tighten the belt 158 as desired. By this arrangement, no extra jack shaft or idler pulley is necessary for tightening the belt. To further prevent slippage, toothed belts and pulleys of the timing variety can be used.

The upward spray pattern can be regulated by varying the speed of the splashers 86, by varying the water level, and by alternating the direction of rotation of adjacent pairs of splashers, and by orientation of the blades to the direction of rotaiton so as to scoop the water effectively, as previously described and shown by FIGURES 4 and 12.

Brief resume

Looking back for a moment, observe that a system has been provided for developing an upwardly projected multiplicity of water droplets. These are directed against a mold plate surface opposite which a polymerizing resin mass is retained for purpose of controlling the exothermic heat developed thereby. This system may be summarized in terms of the following characteristics:

Highly uniform droplet distribution over a substantial surface area;

Absence of clogging because of absence of water jets that would be subject to stoppage by deposition of foreign matter and water-carried chemicals; and Intimate contact between the heat-exchange medium produced in droplet form and the mold plate for perfect control of the exotherm of polymerization of the resin.

The foregoing listing of the characteristics inherent in the present invention leads to the conclusion that the general scope of invention is extensible beyond the particular environment shown in FIGURE 1 of the drawings. Thus, within the broad scope of this disclosure, it is contemplated that the invention is applicable to the control of a polymerizing resin mass carried on any sheet-like mold surface. Thus, such resin mass may be carried by an individual mold and manipulated by one of the following processes:

(a) Continuous movement along a production line analogous to the production line used in describing the environment for the invention;

(b) Incremental movement of such individual mold along a production line; and (c) No movement, where the layup, gel-heating of the resin, and then the final polymerization with exotherm control are provided by the invention, all effected at a single station, and on a stationary mold.

Brief descriptions of these extensions of invention are now set out as follows:

The continuous mold movement process

This is shown in FIGURE 15 of the drawings. An endless wire mesh belt 162 is run over four spaced rolls 164 having their axes in alignment. At least one of the rolls 164 is powered to move belt 162 in the arrow direction 166. On the upper flight 168 are placed inverted box-like mold shapes 170. Molds 170 are suitably formed of thin-walled metal such as cast aluminum or other appropriate material to provide good heat-transfer. The upper surfaces of the molds are appropriately polished and configured to produce a molded image in a resin layup placed thereon. Of course, appropriate release agents will be used so that the parts can be separated, in accordance with such skills available to the molder.

Molds 170 are successively placed on the top flight 168 in inverted position. Inasmuch as droplets of water are thrown upwardly from the control station 172, the molds are suitably flanged as at 171, with the flanges configured to provide an overlap. This prevents the droplets from being thrown up into contact with the accruing resin, and equipment used on the topside of the upper flight 168. At the left side of upper flight 168 the resin layup is effected at station I. There, chopped strand and resin are suitably applied by guns designated by the reference numerals 174 and 176. These are combined to provide a layup 178 on the molds 170, which are moved in the arrow direction 166 at a constant speed along with belt 162.

At station II, a heat source such as a plurality of infrared lamps 180 comes into play as the molds 170 pass therebeneath, to initiate polymerization of the resin in the layup 178.

The gelled layup then progresses in a continuous manner to station III where the polymerization is completed. The body of water 142 at station 172 is maintained at a temperature level such that it acts in a twofold manner:

(1) To supply heat to the polymerizing resin, of a sufficient intensity to kick the polymerization reaction up to its final stage of intensity; and (2) To serve as a heat sink or heat absorber to prevent the resin polymerization exceeding maximum exotherm level, and thus preventing monomer boil.

As mentioned relative to FIGURE 13 of the drawings, the flow of the heat-exchange material is kept moving in an upstream direction to the resin so that the exothermic heat is effectively removed within a relatively narrow control zone that becomes critical during the progressive polymerization of the resin.

By referring to the right side of FIGURE 15, it will be noted that the molds are removed and recycled in the arrow direction 182 after having been passed through a final cure oven, embracing the chain 162, or at a separate location. This permits the parts to be removed from the molds, and the molds cleaned, treated with release agent, and then recycled to the head end of the production line designated by the station I. The chain is recycled on the lower rolls 164 in arrow direction 166.

This process is summarized as a continuous operation wherein a curing resin is exposed to intimate heat exchange contact with a heat exchange medium whereby the exotherm of reaction is dissipated. In this process the parts are constantly moving and meet a counter-current temperature gradient in the form of the countercurrently flowing heat exchange medium.

The increment process

This is shown in FIGURE 16 and utilizes a pair of rails 184 upon which wheeled molds 186 are traveled. Propulsion may be provided by a central chain 188 having studs 191 to engage plates 190 of the molds 186.

Sprockets 192 support the chain 188 and suitable driving means, such as a motor, drives at least one of the sprockets to propel the chain in the arrow direction 194.

It will be noted that the molds 186 are spaced from one another along the rails 184. Thus open gaps between are provided. This requires that the control station 172 be operated intermittently, and thus only while a mold is placed thereover; this prevents the spray from contacting equipment above and around the manufacturing line.

Here, as in the continuous system of FIGURE 15, layup is effected by guns 174 and 176 at station I to produce a layup 178. The chain 188 is then actuated to move the mold from station I and station II, wherein the radiant heat source 180 is activated for a given period of time to initiate the polymerization of the resin.

Thereafter, chain 188 is indexed forwardly to carry the gelling layup from station II to final polymerization station III. Here the mold 186 with the polymerization layup 178 thereon is placed in covering relationship to the control station 172 to confine the water droplet complex there developed. This controls the resin polymerization in a manner analogous to but not exactly like that of the system of FIGURE 15. There the resin is constantly moving over the water droplet system, and meeting a countercurrent flow of heat-exchange medium of decreasing temperature gradient.

In the system of FIGURE 16, the resinous mass remains stationary and the exotherm is removed therefrom by the flow from right to left through the control station 172. There is an approximate duplication of the control shown in FIGURE 15, but the subtle difference becomes at once apparent.

Upon completion of polymerization, the station 172 is shut down and the mold moved therefrom to a post-curing station. The part is then stripped and the mold recycled to the head end of the production line, with appropriate intermediate maintenance as necessary.

It will be observed that FIGURE 16 represents a slight retrogression from the completely automated and continuously moving system shown in FIGURE 15. The system of FIGURE 16 is thus adapted for use by the smaller manufacturer whose volume is not so high and who may be laying up more complex articles that are not adapted to the fast layup as would be required by the continuously moving or high speed production line shown in FIGURE 15.

The stationary system

For the manufacture of extremely large and bulky articles such as fiber reinforced resin boats and the like, the system shown in FIGURE 17 is particularly useful.

Here, the thin walled mold 196 is shown in section as used for producing a boat hull. Actually here the section was taken transversely and centrally of the boat and does not show either the bow or the stern thereof. This thin walled mold is designated 196 and is positioned over a control system 172 of the present invention.

Operation of this embodiment of the invention is as follows:

With the mold 196 in place and the control system 172 shut down, a layup is made by bringing guns 174 and 176 into play over the surface of mold 196 to produce a layup 178 thereon. At the conclusion of this operation, which will usually be a hand operation, but can be automated, a heat source, such as the infra-red lamps 180, will be actuated and played over the surface to initiate or bring the polymerization to the gel stage. This may be done on a remote section of the mold after that portion has been covered with the layup, and the layup operation has progressed to another portion of the mold.

At this point, the utility of the present invention becomes at once apparent. With the polymerization activated to the gel stage, after the layup is completed, the control system 172 is activated. This can be used to supplement the radiant energy from the heat source 180 and bring the resin up to polymerization level faster than by the heat source 180 alone. Be that as it may, the important point is that once the polymerization exotherm has been brought to the maximum safe level, the present system is immediately available to control the exotherm against runaway. Where a boat hull is being made, it will be evident to those skilled in the art that the mass effect provided by the total amount of resin available may become a dangerous factor unless adequate control is provided. In accordance with the present invention, using adequate throughput of heat-exchange medium such as water, and the intimate contact provided by the system wherein the droplets are placed in direct touch with the mold, there is no danger that resin monomer boil will be produced. There is no danger that a large article will be rejected because of defects by monomer boil.

It is to be noted that this last embodiment illustrates a still further retrogression from a continuous production system back through an incremental system to a stationary system. Thus, the present embodiment illustrates the full range of versatility of the invention.

It is believed that the immediately preceding portion of the description clearly illustrates the extended utility of the invention beyond the production of mere flat panels. Thus, more complicated shapes can be made, as long as the underneath side of the mold surface is exposed for direct heat exchange, with the heat-exchange medium being placed thereon in droplet form. Maximum heat transfer is provided.

It should become evident that a further advantage is inherent from the invention. As shown in the drawings, there is no pressure restriction on the heat-exchange medium. Thus, it can be vaporized and dispersed to the atmosphere if desired. It is well known that the latent heat of vaporization of water provides a high heat sink factor; this is available if the criticality of the resin polymerization exotherm requires it.

As mentioned above, acrylic systems can readily reach a +300° F. temperature level, if the resin runs away. As is evident, this will readily vaporize water. Automatically this will utilize the latent heat of vaporization of the water. A tremendous control factor is thereby brought into play. This is over and above the heat-exchange that is available between the actual temperature of the water before vaporization, and the polymerizing resin.

Therefore, it is to be understood that the present invention provides use of latent heat of vaporization as a heat sink in addition to intimate heat-exchange relationship between a body of a heat-exchange liquid and the polymerizing resin mass.

We claim:
1. In a method of producing a panel from a polymerizable resin system exhibiting a substantial exotherm of polymerization,
   the steps of
   providing a first horizontal mold plate of heat-conductive material, having upper and lower surfaces,
   forming a horizontally disposed wet layup on the upper surface of said first mold plate, the layup including a layer of liquid resin system having a high polymerization exotherm and including a boiling monomer component, and covering the upper surface of the layup with a second heat-conductive mold plate and exposing the upper surface of said covering mold plate directly to a heat-exchange liquid, and maintaining the heat-exchange liquid at a temperature to initiate polymerization of the resin,
   applying heat-exchange liquid in direct contact with the entire lower surface of the first mold plate as a uniform pattern of splashed droplets to intimately wet said lower surface and thereby provide perfect heat transfer with the resin exotherm, while maintaining the heat-exchange liquid at a temperature to initiate polymerization and develop the exotherm of the resin,
   and then transferring exothermic heat out of the polymerizing resin and through said mold plates and back into said heat-exchange liquid to maintain said exotherm at a temperature level below the monomer boiling point of said resin system,
   whereby said entire layer of resin is polymerized at once and the exotherm of polymerization is controlled to prevent monomer boil.

2. In a method of producing a panel from a polymerizable resin system having a substantial exotherm of polymerization,
   the steps of
   providing a first horizontally disposed mold plate of heat-conductive material, having upper and lower surfaces,
   forming a horizontally disposed wet layup on the upper surface of said first mold plate, the layup including a layer of liquid resin system having a high polymerization exotherm and including a boilable monomer component, and covering the upper surface of the layup with a second heat-conductive mold plate and exposing the upper surface of said covering mold plate directly to a heat-exchange liquid, and maintaining the liquid at a temperature to initiate polymerization of the resin,
   providing a shallow pool of heat-exchange liquid beneath said first mold plate and maintaining the heat-exchange liquid at a temperature to initiate polymerization and develop the exotherm of the resin,
   splashing the liquid upwardly from said pool as a uniform pattern of distinct droplets against the entire lower surface of said first mold plate, to intimately wet said surface and thereby provide perfect heat transfer with the resin,
   initiating polymerization and development of the exotherm of the resin, and then transfering exothermic heat out of the polymerizing resin and through said mold plates and back into said heat-exchange liquid to maintain said exotherm at a temperature level below the monomer boiling point of the resin system,
   whereby said entire layer of resin is polymerized at once and the exotherm of polymerization is controlled to prevent monomer boil.

3. In a method of producing a panel from a polymerizable resin system having a substantial exotherm of polymerization,
   the steps of
   providing a first mold plate of heat-conductive material, having front and rear surfaces and first and second ends,
   moving a wet layup in direct heat-exchange relation over the front surface of said first mold plate from said first end to said second end, the layup including a layer of liquid resin system having a high polymerization exotherm and including a boilable monomer component, and covering the exposed surface of the layup with a second heat-conductive mold plate and exposing the exposed surface of said covering mold plate directly to a heat-exchange liquid, and maintaining the liquid at a temperature to initiate polymerization of the resin,
   providing a shallow pool of heat-exchange liquid adjacent to said first mold plate, extending from said first end to said second end, and maintaining the heat-exchange liquid at a temperature to initiate polymerization and develop the exotherm of the resin at said second end, and flowing said liquid through said pool from said second end to said first end,
   splashing up the liquid from said pool during said flow as a uniform pattern of distinct droplets against the rear surface of said first mold plate, to intimately wet said surface and thereby provide perfect heat transfer with the resin,
   initiating polymerization and development of the exotherm of the resin, and then transferring exothermic heat out of the polymerizing resin and through said mold plates and back into said heat-exchange liquid to maintain said exotherm at a temperature level below the monomer boiling point of the resin system,
   whereby the heat-exchange liquid of said shallow pool travels upstream against the advancing resin and immediately carries away excess exothermic heat of polymerization from the resin.

References Cited

UNITED STATES PATENTS 2,057,673  10/1936  Fields _____ 264—176
2,057,674  10/1936  Fields _____ 264—337

ROBERT F. WHITE, *Primary Examiner.*

R. B. MOFFITT, *Assistant Examiner.*